United States Patent Office.

IMPROVED PROCESS FOR ORNAMENTING MARBLE.

ASA HILL, OF NORWALK, CONNECTICUT.

Letters Patent No. 60,007, dated November 27, 1866; antedated November 14, 1866.

SPECIFICATION.

TO ALL WHOM IT MAY CONCERN:

Be it known that I, ASA HILL, of Norwalk, in the county of Fairfield, and State of Connecticut, have invented a new and improved Process for Producing Pictures and Ornamental Designs in Marble; and I do hereby declare that the following is a clear, full, and exact description of the same.

My invention consists in applying to the marble two or more chemical agents, which, when applied thereto, shall form chemical combinations with the stone and with each other, and thereby produce not only the desired figure, but also any desired color or combination of colors, insoluble in water, and not liable to be rubbed or washed off, and which shall be made to penetrate the stone and form the figure therein, and thus be as durable as the stone itself.

To enable others skilled in the art to use my process, I will proceed to describe it.

I take a slab or block of marble, and after smoothing its surface in the usual manner, and polishing it with pumice stone or other suitable agents, I then draw thereon, with a pencil or crayon, the outline of the design or figure intended to be produced. To this surface I then proceed to apply the chemical agents by means of a pointed stick or camel's hair brush, in most cases the stick being preferable. As fast as the chemical thus applied is absorbed the application is repeated until a satisfactory result is attained. If it be desired to have the figure produced deeply within the marble, as well as on the surface, I place the marble over a steam bath, allowing the steam to act upon the under surface of the slab; but it is not necessary to subject the marble to heat in all cases in order to produce satisfactory results. After the application of the chemical in this manner I allow the slab to remain until the chemical has had time to unite with the calcareous matter of the stone. I then wash the surface with a sponge and clear water, after which the marble is polished in the ordinary way, and the figure remains in the stone. Where it is desired to use a block instead of a slab, the entire block may be immersed in a chemical solution, varying in its nature or composition, according to the nature of the results desired or sought to be produced, and thus color the entire mass more or less.

The agents used in my process are not ordinary pigments, but I employ such chemicals as will combine with the marble and with each other, and thus develop the desired tints in the marble itself, without disintegrating or destroying the structure of the same.

The preparations which I use are principally composed of the salts of iron, copper, potassa, silver, and tannin, although other chemicals may be used and afford means of producing similar results. The solvents I employ are chiefly water, alcohol, and spirits of ammonia.

For producing a red color, I use a solution of copper with ammonia; for instance, the sulphate of copper dissolved in hartshorn. Subsequently I apply a solution of ferro-cyanide of potassium in water over the copper; this produces a red or rose color. For producing red tints, I combine a solution of nitrate of silver in water with a solution of bichromate or chromate of potash, first applying one and then the other upon the marble; or I take a solution of cochineal in spirits of ammonia; or the common red ink of the shops combined with a solution of tannic acid in spirits of ammonia. For flesh tint, I use solution of sulphate of copper, and afterwards apply solution of ferro-cyanate of potassa. This develops a beautiful flesh tint.

For blue, I apply a solution of hypo-sulphate of iron in water; this, according to its strength, will produce a dingy yellow color. Subsequently I apply over this a solution of ferro-cyanide of potassium, which produces a blue color; or, I dissolve either chloride of copper, or sulphate or ammoniate of copper, in spirits of ammonia.

For black, I apply to the marble a solution of sulphate of iron in water; I then apply over it a solution of gallic acid, which, combining with the iron, produces a black tint; or I apply a solution of nitrate of silver, and expose it to the solar ray; or nitrate of silver and gallic or tannic acid; or sulphate of iron and nitrate of silver; or sulphate of iron and ferro-cyanide of potassa and tannin.

For yellow, I apply, first, sulphate of iron dissolved in water, and subsequently picric acid in solution; or instead, the bichromate or chromate of potash in solution, and afterwards a solution of the picric acid, to give it intensity; or picric acid, chromate of copper, or bichromate of copper, &c.

The marble itself supplies the light tints. Minor shades are produced by blending these various compositions. The above are varied according to circumstances.

If desired, photographic pictures may be produced in the marble by first applying to the marble a solution of nitrate of silver, and then placing over it the negative, produced in the usual manner, and submitting it to the action of light, as in the ordinary case of printing photographs, after which the chemicals may be applied as above.

By the application of my process, as herein described, any desired style and color of figure or likeness may be produced at will. By this means tables, mantles, walls, and articles made of marble, may be readily and beautifully ornamented, and for less expense than by carving; and in many instances—as, for instance, upon the surface of a table—where carving cannot be employed. Also for producing endless variegations in marble, and coloring whole slabs to be used as mosaic in building or ornamentation. It may also be applied in statuary, and be made to give to marble all the colors and tints of life, as well as of dress and drapery. For exterior decoration it is superior to carving, inasmuch as being incorporated chemically with the stone, it is as indestructible as the stone itself, and at the same time does not afford a lodgment for dust and dirt, which so soon disfigure and ultimately destroy fine and elaborately carved work. If the surface of the marble becomes worn by time and the elements, it is only necessary to repolish it, when the figure produced by this process will stand forth as bright and perfect as when originally produced. It is particularly applicable as a means of ornamenting marble buildings, both outside and in; and also for lettering and ornamenting tombstones, tablets, and monuments. By this means the likeness of deceased persons may be produced upon their tombstones and rendered as lasting as the stone itself.

Having thus fully described my invention, what I claim, and desire to secure by Letters Patent, is—

The process of producing figures upon and in marble, or other calcareous stones, substantially as herein described.

ASA HILL.

Witnesses:
 J. J. WALLACE,
 ASA B. WOODWARD.